United States Patent [19]
Boeuf

[11] Patent Number: 6,009,502
[45] Date of Patent: Dec. 28, 1999

[54] METHOD AND APPARATUS FOR FAST AND ROBUST DATA COLLECTION

[75] Inventor: Patrick Boeuf, La Gaude, France

[73] Assignee: International Business Machines Corporation, Armonk, N.Y.

[21] Appl. No.: 08/934,583

[22] Filed: Sep. 22, 1997

[30] Foreign Application Priority Data

Dec. 20, 1996 [EP] European Pat. Off. .............. 96480128

[51] Int. Cl.$^6$ ..................................................... G06F 12/00
[52] U.S. Cl. ......................... 711/170; 711/112; 711/209; 707/205
[58] Field of Search ............................ 711/164, 5, 209, 711/170, 112; 707/205; 709/212, 213, 214, 215, 216, 217, 218, 219, 245

[56] References Cited

U.S. PATENT DOCUMENTS

| | | | |
|---|---|---|---|
| 5,146,575 | 9/1992 | Nolan, Jr. ................................. | 711/164 |
| 5,371,885 | 12/1994 | Letwin ..................................... | 707/205 |
| 5,594,881 | 1/1997 | Fecteau et al. .......................... | 711/209 |

*Primary Examiner*—John W. Cabeca
*Assistant Examiner*—Nasser Moazzami
*Attorney, Agent, or Firm*—Gerald R. Woods

[57] ABSTRACT

For storing and retrieving data, the present invention enhances performance by allocating a single oversized contiguous storage area and by allowing data wrapping. Reliability is insured by verifying the coherence of stored variable length records at each READ operation. The coherence verification is optimized because the information required for verification, comprising a set of key values, is stored in the records themselves.

10 Claims, 9 Drawing Sheets

APPLICATION LAYER

SECTOR SIZE: 1          FILE SERVER
BLOCK SIZE: 4           HEAD KEY:
FILE SIZE: 12           TAIL KEY:
NBE BLOCKS: 3           BASE KEY:

RECORD READ BUFFER

| BLOCK | |
|---|---|
| <2 2,3 B \| B \| B \| B 2> | <x x,x x \| x \| x \| x x> |

OPERATING SYSTEM LAYER
LOGICAL FILE

| | d | | | | e | | | | f | | | |
|---|---|---|---|---|---|---|---|---|---|---|---|---|
| | A | A | A | A | B | B | B | B | e | e | e | x |
| | 0 | 1 | 2 | 3 | 4 | 5 | 6 | 7 | 8 | 9 | 10 | 11 |

FIG. 4

APPLICATION LAYER

FILE SERVER

SECTOR SIZE: 1  HEAD KEY:
BLOCK SIZE: 4  TAIL KEY:
FILE SIZE: 12  BASE KEY:
NBE BLOCKS: 3

RECORD READ BUFFER

| BLOCK | | | |
|---|---|---|---|
| <1 0,0 A | A | A | x y> |

OPERATING SYSTEM LAYER
LOGICAL FILE

| a | | | | b | | | | c | | | |
|---|---|---|---|---|---|---|---|---|---|---|---|
| A | A | A | e | x | x | x | x | x | x | x | x |
| 0 | 1 | 2 | 3 | 4 | 5 | 6 | 7 | 8 | 9 | 10 | 11 |

FIG. 5

APPLICATION LAYER

FILE SERVER
SECTOR SIZE: 1          HEAD KEY:
BLOCK SIZE: 4           TAIL KEY:
FILE SIZE: 12           BASE KEY:
NBE BLOCKS: 3

RECORD READ BUFFER

OPERATING SYSTEM LAYER
LOGICAL FILE

FIG. 6

APPLICATION LAYER

FILE SERVER

SECTOR SIZE: 1  HEAD KEY:
BLOCK SIZE: 4  — 240  TAIL KEY:
FILE SIZE: 12  BASE KEY:
NBE BLOCKS: 3

RECORD BUFFER 3 BLOCKS

| BLOCK 210 | | | | | | | | | | |
|---|---|---|---|---|---|---|---|---|---|---|
| <4 4,6 C | x x | 4 c | c 4> | <5 4,6 c | 5 c | 5 c | c 5> | <6 4,6 c | 6 c | 6> |

OPERATING SYSTEM LAYER
LOGICAL FILE

| | g | | | h | | y | | i | | | |
|---|---|---|---|---|---|---|---|---|---|---|---|
| e | C | C | C | C | C | C | C | C | C | B | x |
| 0 | 1 | 2 | 3 | 4 | 5 | 6 | 7 | 8 | 9 | 10 | 11 |

METHOD AND APPARATUS FOR FAST AND ROBUST DATA COLLECTION

FIELD OF THE INVENTION

The invention relates to file server applications and, more particularly to improved methods and apparatus for saving and retrieving large numbers of records.

BACKGROUND OF THE INVENTION

Log file server applications are used in a distributed environment for logging network information received concurrently from distributed systems, each having its own network address. Such distributed systems may be referred to from time to time as network clients or just clients. Any kind of network information can be stored, such as network management information or client accounting data, both of which are examples of vital data. A requirement for processing and storing such vital data implies a need for a reliable log file server application. If the server application suffers an unplanned interruption, a minimum amount of data should be lost and any damaged data should be identified when the application is resumed.

The amount of data to be stored in a file server is generally a function of the size of the network. In modern networks, such as those allowing high speed inter-site communications, a large amount of data sent substantially simultaneously from a number of clients must be stored on the server. This requirement implies a need for a logging application. If the performance of the logging application is poor, significant amounts of data may be lost or degraded when multiple clients attempt to concurrently write data to the file server. On the other hand, if performance of the logging application is good, the application can use an optional reliable protocol to advise one of the clients to stop sending data. This reduces the amount of data lost.

A known solution for logging and storing network data is based on use of a multifile file server. Received data is written into a limited size file until a buffer full condition occurs for that file. A new file is then opened to provide storage of data yet to be received. This prior art solution is described in an Internet-draft document disclosing a Connection-Oriented Accounting Mib 'draft-ietf-atommib-acct-03.txt' of Keith McCloghrie, Juha Heinanen, Wedge Green and Anil Prasad, dated Jul. 31, 1996. In this document, the storage area allocated for accounting data sent by SNMP agents in a TCP/IP network has a given maximum size. When storage area is filled, the agent either automatically switches to another new file, or new records are discarded. This document encourages the use of files having at least a minimum size.

Where multiple files are employed, the prior art solution permits storage of greater numbers of records. The efficiency of data write operations are enhanced by switching to new files rather than using processing time in trying to reuse unoccupied space in the existing files. However, complex file management operations (such as assignment of a file name for a new file, closing of the existing file, opening of the new one and deleting the oldest existing file to free up storage space) are necessary before each write operation to a new file. and disk space can be fragmented over the life of multiple files. Consequently, write efficiency may be degraded over time.

The prior art proposes no mechanism for assuring the reliability of data write operations. To prevent the multiple file logging server application from introducing discrepancies into files when restarting from an unexpected interruption, backup files have to be managed. However, where use of a backup file becomes necessary, the overall performance of the data storage application can be degraded. If data is stored in multiple files and it becomes necessary to retrieve a backup copy of one of those files, there is always the possibility that the file space for that particular backup file will have been recycled to make space available for new files. The loss of a single backup file can corrupt an entire data set stored over multiple files even if the backup file space had not been reused or had been reused for a minimal amount of new data.

SUMMARY OF THE INVENTION

The present invention overcomes the noted problems of the prior art approaches by allocating a fixed-size storage area of contiguous memory for saving native logging data in variable length records, by allowing data wrapping and by storing information necessary for data integrity verification inside each record.

The invention solves write performance problems by using a single file, thus avoiding any need for complex and time-consuming multiple file management operations. Moreover, physical accesses to the disk storage in write and read operations are optimized by initially allocating contiguous memory locations.

Data integrity is optimized by performing coherence verification at the record level, using a system of keys and relative offsets, stored inside the records themselves.

Because the cost of data storage has decreased greatly over time, it is financially feasible to initially allocate an oversized storage area. This makes it possible to greatly reduce the risk of record contamination where wrapping occurs even if the peak speed for writing is greater than the peak speed for reading.

In addition to optimizing performance of write and read operations as discussed above, a protocol can be implemented between the logging server and the client to prevent the client from sending data when the server is longer able to perform normal data storage operations. Such a protocol will operate to limit the amount of client vital data which might be lost.

The invention can be employed with any direct access media storage and can be implemented on low cost servers since there are no requirements for sophisticated file management services or for specific features of direct access storage devices.

BRIEF DESCRIPTION OF THE DRAWINGS

While the specification concludes with claims that particularly point out and distinctly claim that which is regarded as the present invention, further details of a preferred embodiment of the invention may be more readily ascertained from the following technical description when read in conjunction with the accompanying drawings wherein:

FIG. 8, consisting of FIGS. 8A and 8B taken together, is a flow diagram of a complete record READ validation operation.

DETAILED DESCRIPTION OF THE PREFERRED EMBODIMENT

In the preferred embodiment, the application is employed to collect data at or retrieve data from a server equipped with disk storage units where data is received in messages from clients in the network. The necessary file structure and related WRITE and READ operations, including data coherence verification, are described below. The use of disk storage units at the server is described by way of example only. The same solution can be used for data stored in any other direct access storage media.

Figure 1:
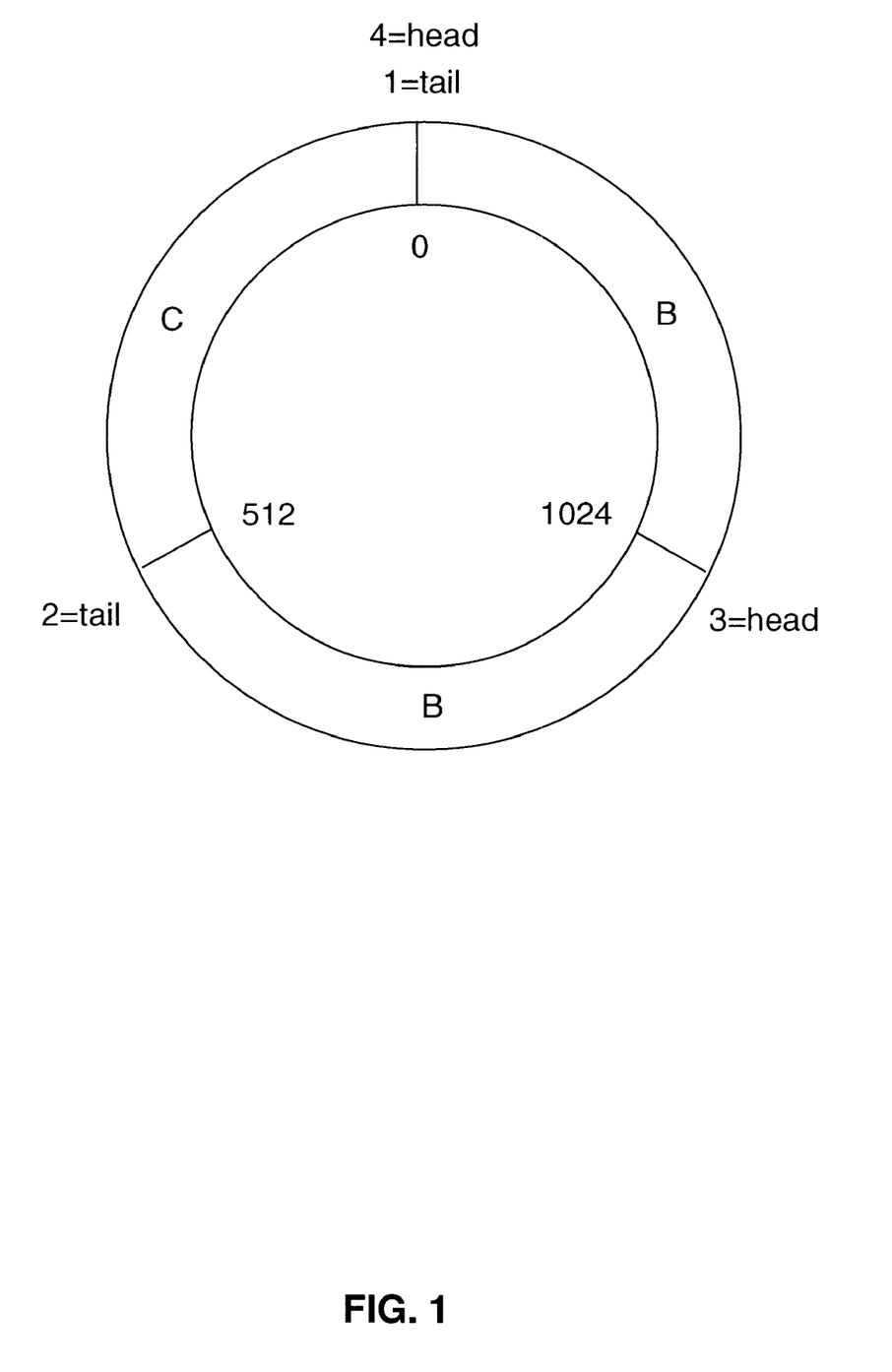
FIG. 1 illustrates a logging file physical model.

FIG. 1 illustrates data wrapping according to the preferred embodiment. The illustrated ring represents an allocated data storage area having a relative address of 0. The storage area, consisting of contiguous memory locations, is allocated as multiples of data blocks with size of the blocks being a function of the size of the data record most frequently recorded. FIG. 1 illustrates the state of a file having three uniform data blocks in which a first logical record A (not shown) is assumed to have been written in a data block at offset 0, followed by a second logical record B (two blocks in length) and a third logical record C one block in length. Because the total amount of data to be recorded for records A, B and C (four blocks) exceeds the allocated three block capacity of the file, Record C is written into the file in the place of the first record A; that is data wrapping occurs. Each block is addressed using a file offset. The file offset is incremented by the block size each time writing to a new contiguous block must be initiated.

An incremental key is assigned to each block used by a record. The initial or first key is assigned a value of 1, a head key is set equal to the total number of data blocks into which data has been written since the start of write operations, including any block into which data is to be currently written and a tail key is the smallest block key used by the oldest record. When record A is written at offset 0, the tail key is 1 and the head key is 1; when record B is written at offset 512, the tail key is 1 and the head key is 3; when record C is written at offset 0, the tail key is 2 and the head key is 4. It is noted that the offset value is always a relative offset value. The example of FIG. 1 defines the first offset as offset 0.

A base key is defined as the key corresponding to offset 0.

Figure 2:
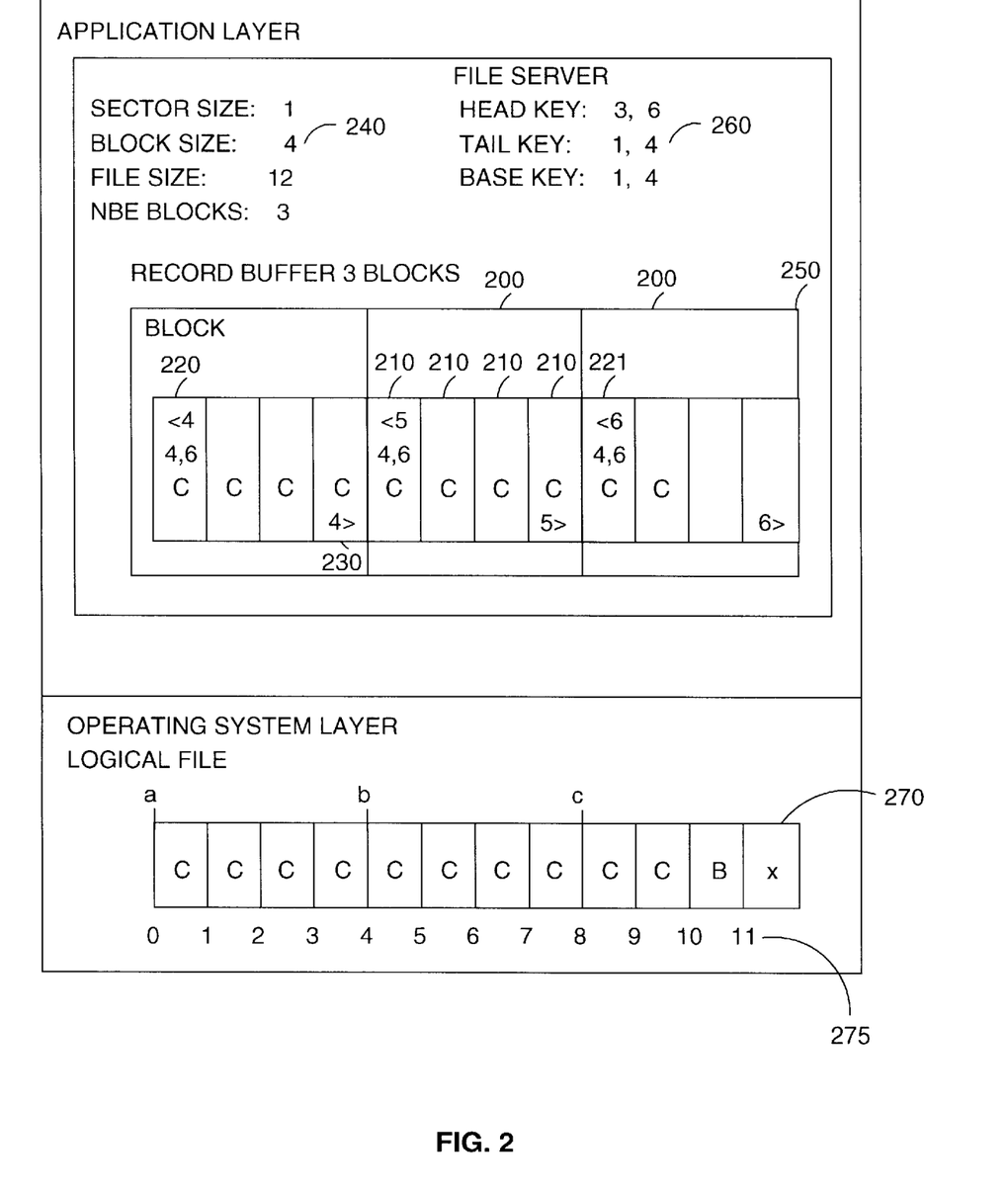
FIG. 2 shows a normal WRITE operation in the logging file.

FIG. 2 shows configuration parameters of an allocated logging file (240). These parameters are known to the WRITE application. For this example, the unit of parameter values is 1024 bytes. The WRITE application also maintains three key variables (260) containing the information required to address the oldest and the most recently written block in the logging file. Two sets of values are represented, the first set (3,1,1) being the value of the parameters before an assumed WRITE operation and the second set of values (6,4,4) being the value of the parameters after the WRITE operation.

FIG. 2 shows the result of the WRITE operation of a logical record C in the logging file. A buffer (250) comprises 10 sectors (210) and a block (200) within the buffer comprises 4 sectors. As a block is the unit chosen for the logging file, the logical record which is assumed to be written in the illustration will use 3 blocks in the logging file with the blocks always being logically contiguous. Each block used by the logical record has a top header (220) for the sector at the top of the block and a bottom header (230) for the sector at the bottom of the block. The top header includes the block number key (221), the top key of the current block, the top key of the first block of the logical record and the top key of the last block of the logical record. The bottom header (230) includes the block number key of the current block. The top key of the first block of the logical record is set by incrementing the head key value in the pre-WRITE file variables (260) by one (Head key+1). Once the WRITE buffer is ready, the head key (first variable of the set of three variables (260)) is incremented with the number of blocks of the WRITE buffer. The tail key which is the second variable is updated as follows:

$$NTK = OTK + WBnb \text{ (modulo LFnb)}$$

where NTK (value of 4) is the new tail key, OTK (value of 1) is the old tail key, WBnb (value of 3) is the number of blocks in the WRITE buffer and LFnb (value of 3), the number of blocks of the logging file.

The new base key, which is the third variable of the set of three variables (260) is updated as follows:

$$NBK = OBK + LGnb * f(NHK)$$

Where OBK is the old base key, NBK is the new base key and LGnb is the number of blocks of the WRITE buffer and f is a function of the new head key (NHK):

f(new head key)=0 if NHK is a multiple of LGnb f(new head key)=1 if NHK is not a multiple of LGnb The first block of the WRITE buffer is written in the logging file at the block offset calculated as follows:

$$\text{block offset} = (\text{top key} - \text{new base key}) * \text{block size}$$

For the values of FIG. 2, the block offset=(4−4)4=0

FIG. 2 illustrates a logical record (270) with the corresponding offsets (275) in the logging file. This is the logical representation of the file seen by the operating system.

It is noted that only the head key has to be saved at each WRITE operation to be able to read the logging file at a later time. The use of tail key and the base key are optional. As a matter of fact, the computation of the tail key value to be positioned at the beginning of the logging file can be performed using the head key and the number of blocks N of the logging file:

$$\text{tail key} = \text{head key} - N + 1$$

The offset of one block whose the top key is known can also be computed without the use of the base key:

if the top key is less than N, then offset=(top key−1) blocks (expression 1);

if not, offset=(remainder (top key/N)−1) blocks.

It is easier to maintain only a head key instead of the head key, the base key and the tail key. However, for the preferred embodiment where the solution applies to low cost equipment, the expression 1 computation may result in an overflow condition in the computer, especially when the maximum key is large (for large logging file) such as $2^{**}64$ bits for a key of 8 bytes. To avoid the overflow condition, it is preferable to employ subtraction operations instead of division operations. In this same context, another expression which can be used for base key computation for a given block key is:

$$\text{base key} = 1 + (\text{integer part}((\text{given key} - 1)/N)) * N \qquad (5)$$

If the server application initially allocates logging files, the first block of the first logical record will not necessarily be the written at the block key 1. Optionally a first key could be defined and given as a starting key for the application. The first key can be the last key of a previous logging file for which the key sequence is consequently preserved. The administrator will always be able to evaluate the volume of data historically logged in the logging file. The way to initialize a new logging file supporting a first key (FK) not equal to 1 is to write a dummy record with a unique block and a data length (length of data in the block, information which can be stored in the top header) equal to zero at the offset corresponding to the FK key. The head key is set to FK.

Figure 3:
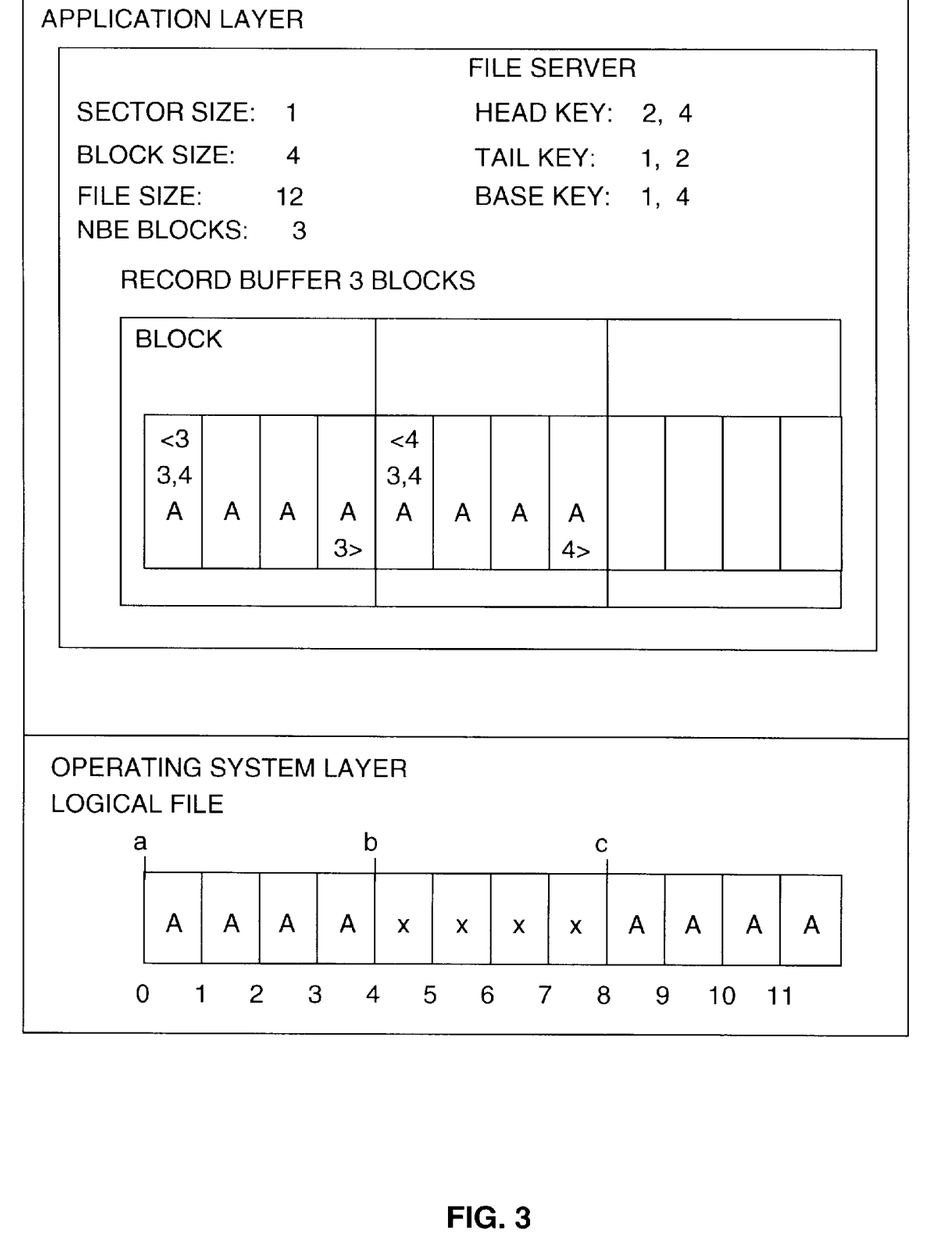
FIG. 3 illustrates a logging file record with a normal WRITE 0 offset overlay.

FIG. 3 shows the result of a WRITE operation with a WRITE buffer configured as shown in FIG. 2. The difference is that the logical record is written with a physical overlay in the logging file. Suppose the head key before setting record A in the buffer is set to 2. This head key corresponds to the newest valid record for this file and satisfies the validity controls. This head key is used to determine the next offset to write the next record, but is not necessarily the youngest one. The youngest record written could be detected not complete because a previous interrupt. In this case, the youngest record retained could not be the youngest one, but the youngest valid one. If the tail key is set to 1, it corresponds to the case where the file has not yet wrapped. Usually, the tail key corresponds to the oldest record that does not satisfy necessarily the validity controls. The oldest tail key is the head key minus the number of blocks plus 1 when the file has wrapped or the oldest tail key is equal to the base key and equal to 1 when the file has not yet wrapped. The tail key value can be above the oldest tails key when a read instance or the lower key value intersection of several read instances have acknowledged the reception of some records. Suppose the base key corresponding to the 0 offset is set to 1. The base key is incremented by 1 at each file wrap during the write. A case exists when we use the base key and where we need to restore a previous base key. It is when the current key used to calculate the offset is lower than the base key, this case can exist for the tail key offset calculation. The A data record received is fragmented into 2 contiguous blocks. The number of fragments 2 gives the first top key that is the head key plus 1 and gives the number 3. The last top key that is the head key plus the number of fragments that gives the last block key number 4. We set the head key to the last record key that gives the value 4. We loop on the fragment number and we fill the buffer, we set the record key to 3, in the top header we set the top key 3, the first top key 3, the last key 3, we set the length of the first data fragment that corresponds to a complete data space for this block. We copy the first data fragment, we set the bottom header with the record key 3 as the last bytes for this block. The next and last fragment is the top key 4, in the top header we set the top key 4, the first top key 4, the last top key 4, we set the length of the last data fragment, we copy the last data fragment, we set the bottom header with the top key 4 as the last bytes for this block. The previous top key can be the first top key when the data record has multiple fragments or blocks, the top key is the head key when the data record has a single block.

The first write offset is now calculated as follows:

$$\text{number of blocks} = 4 - 3 + 1 = 2$$

$$\text{write offset} = (3 - 1) * 4 = 8$$

$$\text{next base key} = 1 + 3 = 4$$

As the first offset is not offset 0 and as the top key of the second block to write (4) is greater or equal to the base key (4), then, the buffer to write overlays the 0 offset. We need for that case two write operations; a first write operation with the first write offset and the first length calculated as follows:

$$\text{first length} = (4 - 3) * 4 = 4$$

a second write operation with the second offset, 0, and the second length:

$$(4 - 4 + 1) * 4 = 4$$

The new base key is 4.

Figure 8A:
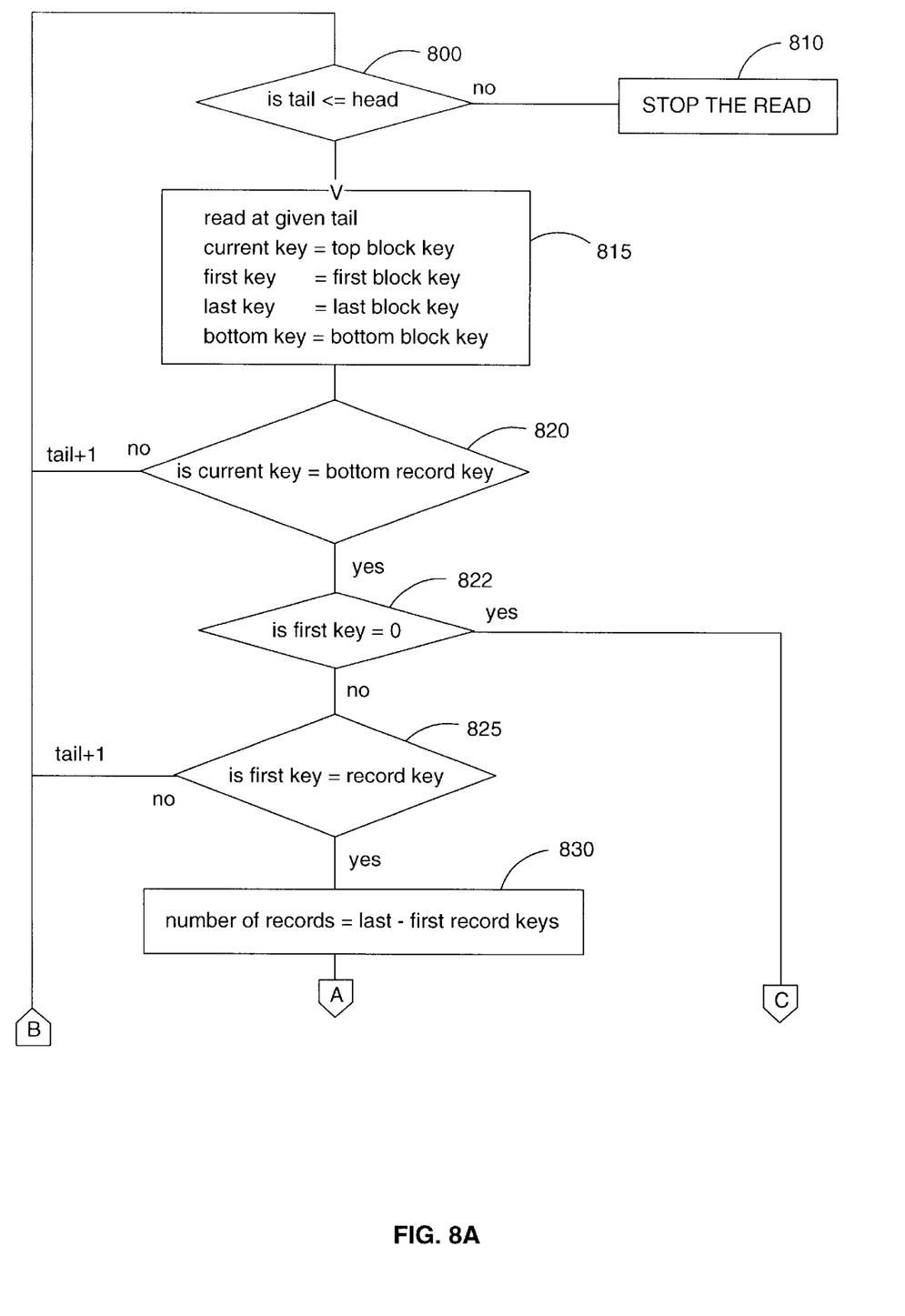
Figure 8B:
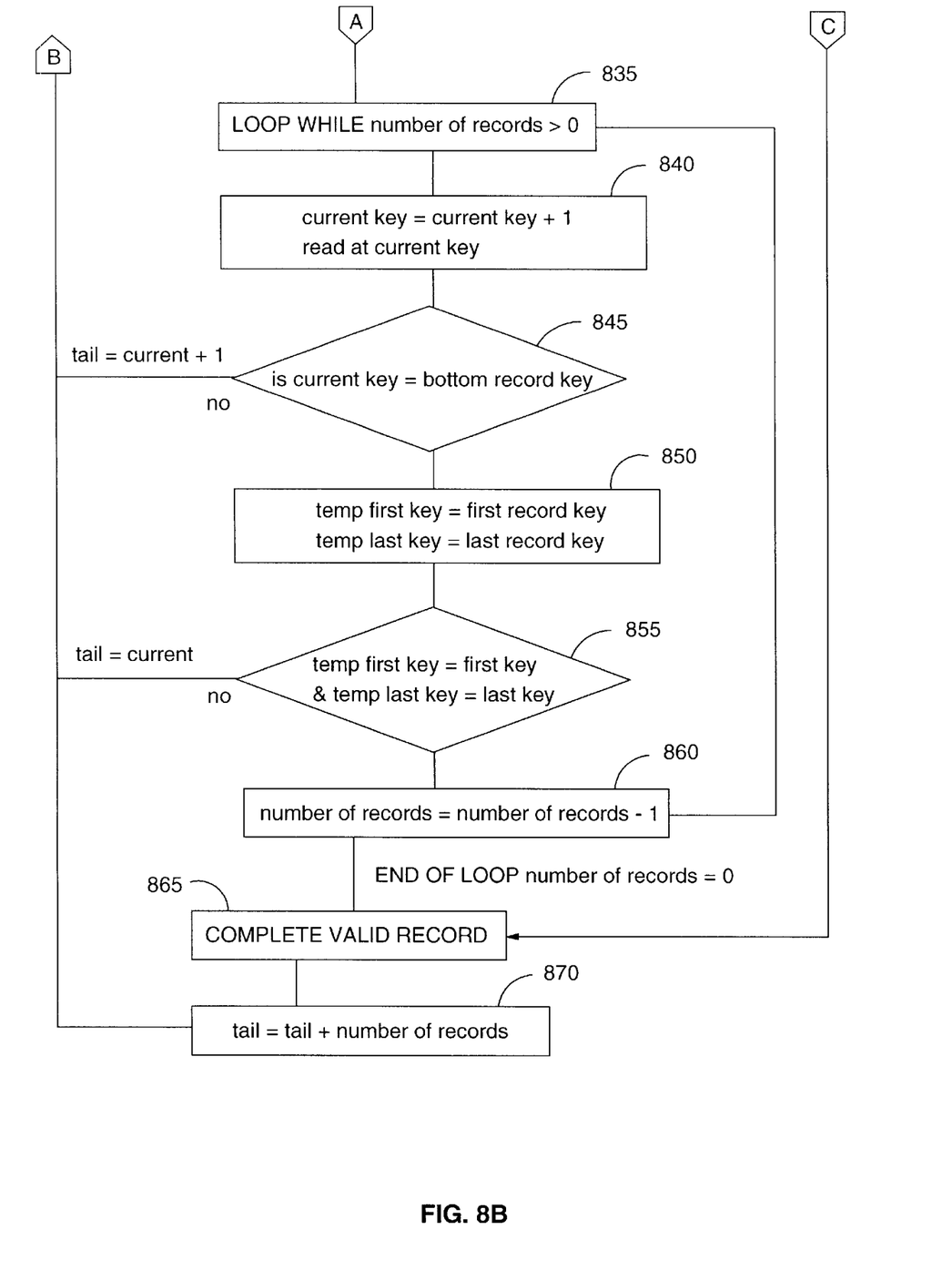

The READ operation is illustrated by the chart flow of FIG. 8. This operation is executed when a client sends a request (one instance) for retrieving the logging file (LF). The set of three variables (260) is firstly read and is used to start the READ operation of the logging file. The READ operation proceeds at the block level. The READ operation, according to one object of the invention performs the Logical record coherence checking: if a block of the one logical record is not coherent the all logical record is given up.

If operation (800) shows the tail and head key values are not coherent (tail key>head key) or if no block is written (tail key=head key), then the READ operation stops (810); if the head key is greater than the tail key, then starting at the tail (the oldest block of the file) the top header and the bottom header of the block are read (815. If there is a discrepancy between the top key and the bottom key (820), the logical record is skipped (tail+1) and the next block is read. If not, the case where the key is 0 (test 822, yes branch) is then considered: this means that it is a single block.

It is noted that the choice to set in the first block of a logical record having only one block the first and last keys of the top header to 0 in the case where there is only one block in the logical record is optional. One other choice could be to have the two keys set at the identical values: 1,1 or 2,2 or . . . n,n. This second solution is not preferred as it costs useless update of variables. The (0,0) solution saves performance.

Coming back to FIG. 8, the record is complete and valid (865) and the tail is updated to the next block (870). When the first key is not equal to 0 (branch no of test 822) this means that the logical record comprises more than one contiguous block. The number of blocks in the logical record is computed (830) and until the last block is reached (835) the current key is incremented and the corresponding block is read ((840). For reading the offset is calculated still using the computation:

$$\text{block offset} = (\text{top key} - \text{new base key}) * \text{block size}$$

This block is read directly from the storage unit (disk or cache memory etc..). The intrinsic block coherence is checked (845) and if it fails (no branch of test 845) the tail key is set to the current key+1 and the logical record is bypassed. If the intrinsic coherence is valid (yes branch of test 845), the block is intrinsically valid and the first and last keys are checked for their equalities (850, 855). If one of the key the first or the last or the two are not equal (no branch of test 855), the read is bypassed and the tail is set to the current key but not incremented by 1 because the block just read can be valid. If the temporary first key equals the first key and the temporary last key equals the last key (yes branch of test 855), this block is part of a valid record, the number of record is decremented (860) and we can continue to read the next contiguous block (according to 835 end of loop only if the number of blocks is zero). When we reach the number of blocks read, this logical record is declared valid (865) and can be given for processing or delivery. Then the tail key can be incremented of the number of blocks just read.

Figure 4:
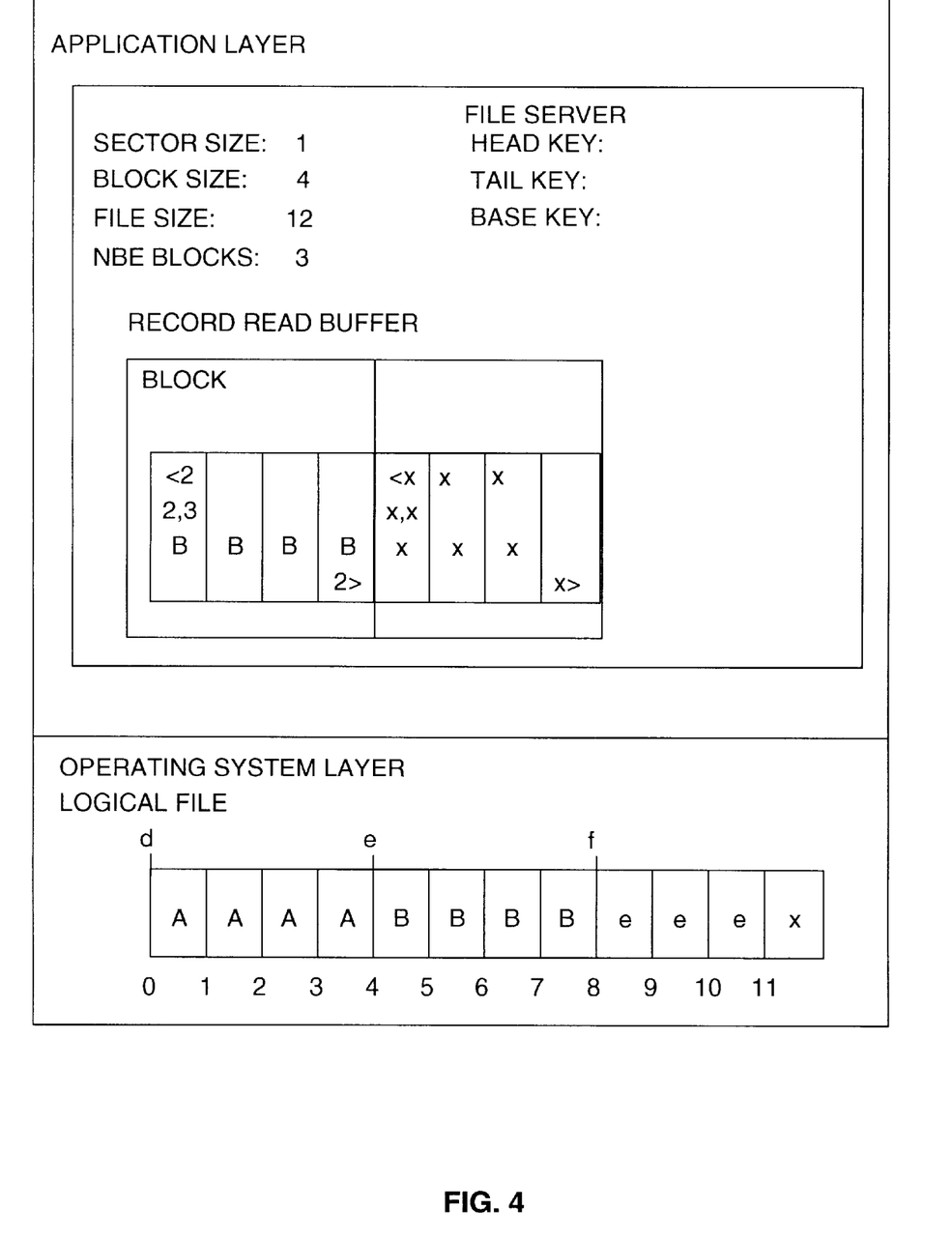
FIG. 4 illustrates a logging file record when there is an interrupt during the WRITE operation, resulting is loss of the last block.

FIG. 4 illustrates an invalid record due to a first error. An error may happen when an unexpected interruption of the logging application occurs during a WRITE operation. In the case illustrated in FIG. 4 the last block is missing. The READ operation detects that the second block does not belong to the same logical record as the previous contiguous one (855). This logical record is given up in the read operation of the logging file. This implies that the WRITE operation was interrupted before the last block could be written. In the logical file seen by the operating system the third contiguous block has not been written (offset 8).

Figure 5:
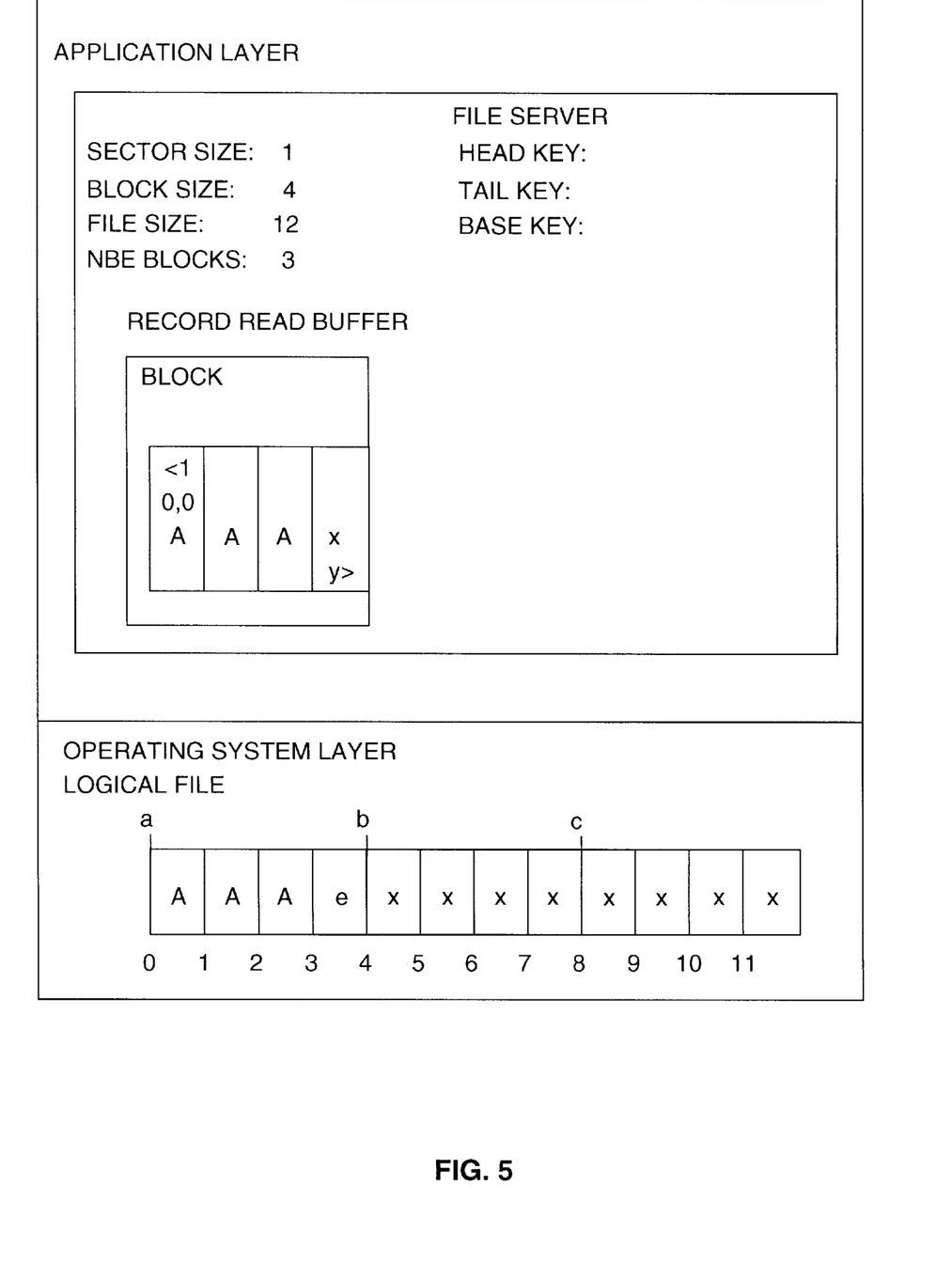
FIG. 5 illustrates a logging file record when there is an interruption during the WRITE operation, leaving the first block is incomplete.

FIG. 5 illustrates an invalid record due to a second error, which can occur when an unexpected interruption of the logging application occurs during a WRITE operation. In the case illustrated in FIG. 5, the first block is incomplete. The READ operation detects the missing block in its checking of coherence within the block (820). This implies that the WRITE operation was interrupted before the last block could be written. In the logical file seen by the operating system the third contiguous block has not been written (offset 8).

Figure 6:
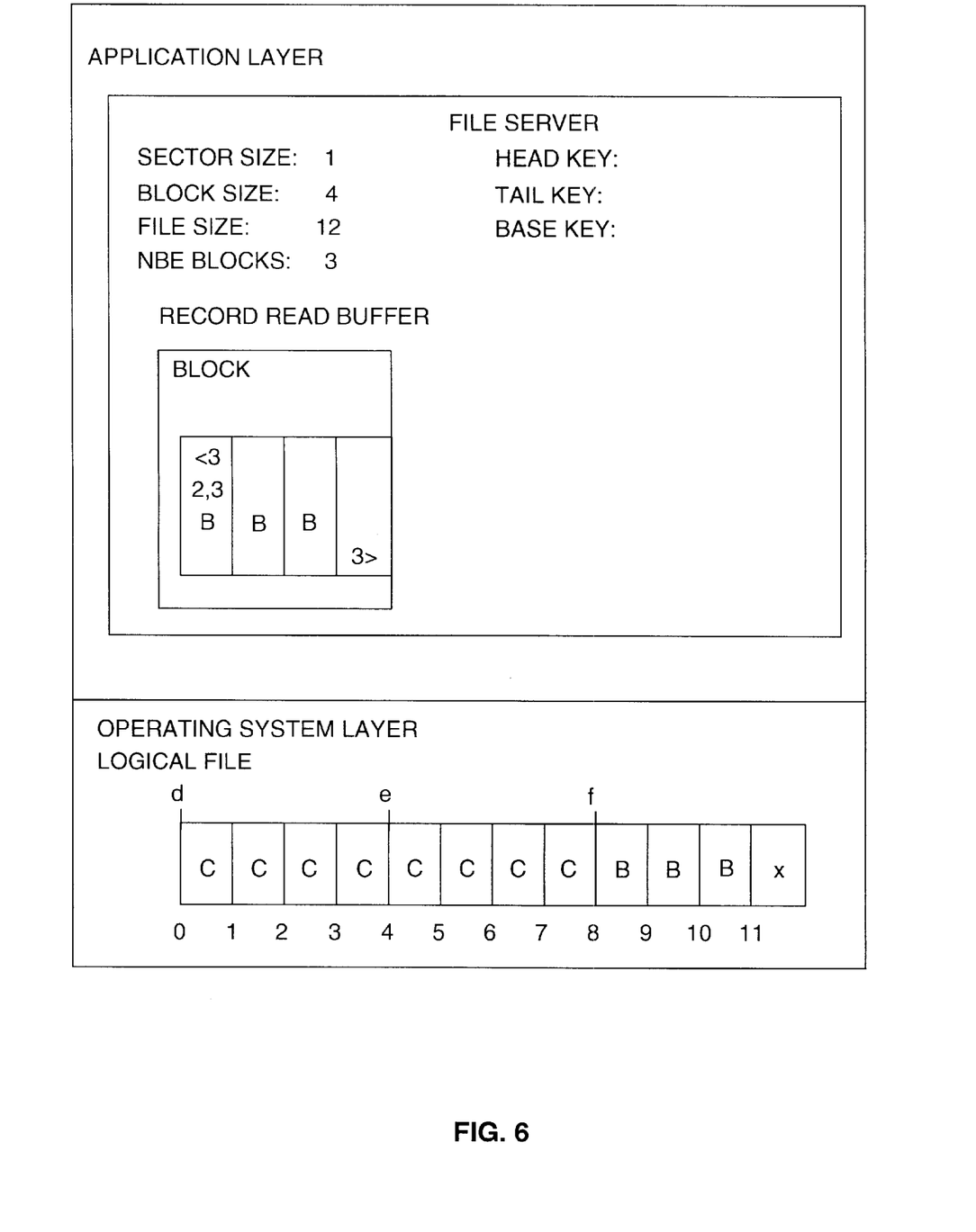
FIG. 6 illustrates an invalid record which is detected after an old record WRITE ahead overlay.

FIG. 6 illustrates an invalid block B. A first block has been read in the read buffer. Internal coherence is correct (820) for this according to the top key 3 set in the top header 220 and the key 3 also read in the bottom header (230). However, the two other keys of the top header 2, 3 indicate that the top key of the first block of the logical record is 2 and not 3. This means that in the logical record of the logging file the first block is missing. This checking is performed during the READ operation (825).

Figure 7:
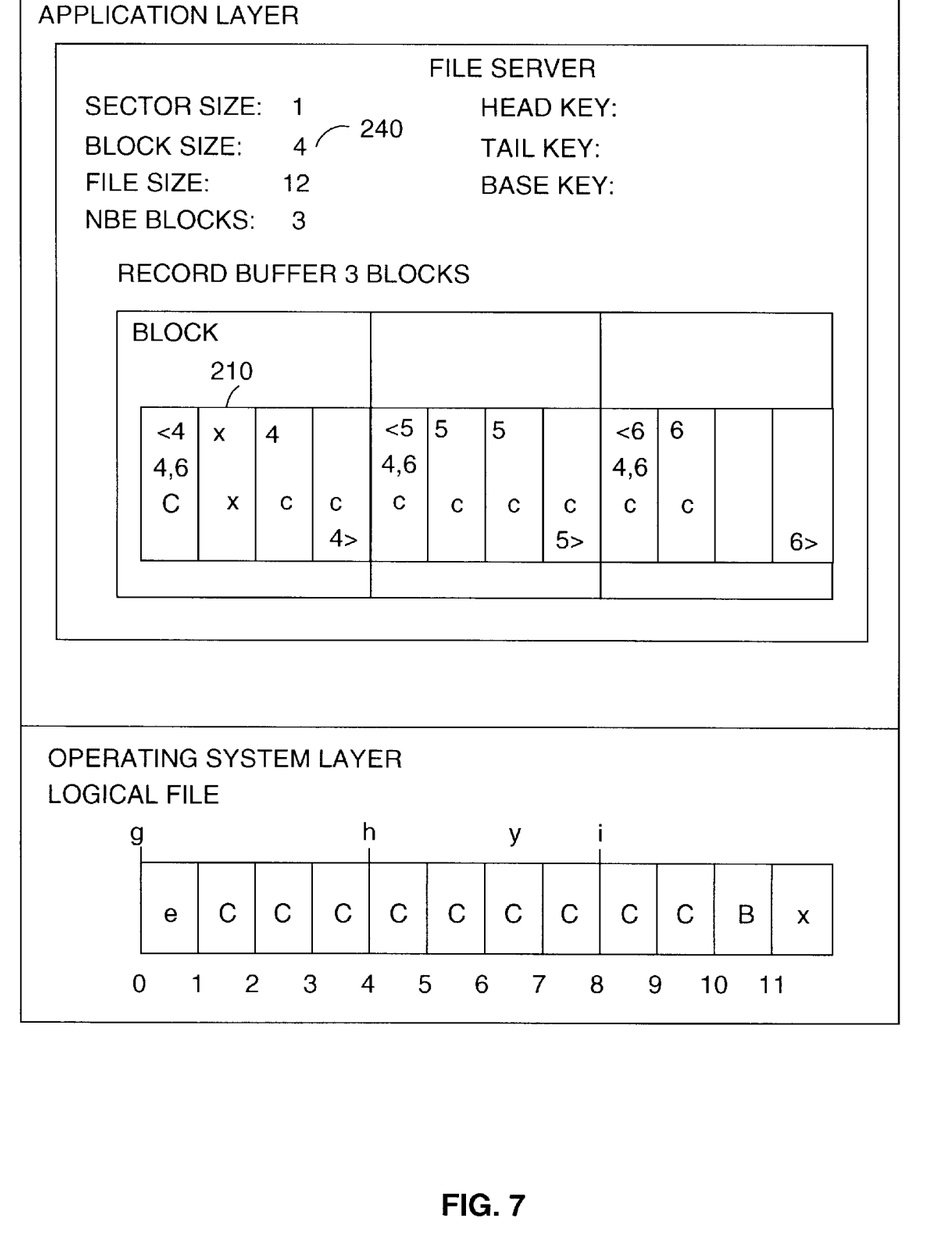
FIG. 7 shows an invalid record which can be detected during the operation of sector replacement which the system performs to maintain a constant file size.

FIG. 7 illustrates an optional feature of the preferred embodiment of the invention. This optional feature reinforces coherence checking inside a block to detect invalid logical records in the READ operations. This figure shows a READ operation of a logical record in the logging file comprising three blocks with the data C. Physically, the storage unit for building the logging file can be an integer number of a smaller addressable storage unit. When the smaller addressable storage unit is the smallest addressable storage unit, the operating system usually, is able to manage, transparently to the I/O application program interface, the replacement of the defective smallest storage unit. In the preferred embodiment (240), the unit chosen for building the logging file is a block of 4096 bytes comprising 4 sectors of 1024 bytes each, the sector being the smallest addressable unit for the operating system considered.

A sector presence key is added in each block for each sector between the first and the last sector of the block. As a matter of fact, the intermediate parts of the block above two sectors are not checked for coherence by the READ operation, which checks only the top and the bottom sectors of the block. The sector presence key of one block is equal to the top key.

During the READ operation, if the logical record is coherent after the first level of validation is performed (flow chart of FIG. 7), additional checking is perfomed in the READ buffer on the sequence of sectors of the blocks read. In FIG. 7 the first block is invalid as the expected sector presence key (4) is not found in sector two (210). The discovery of the non-coherent block invalidates the entire logical record.

While there has been described what is considered to be a preferred embodiment of the invention, variations and modifications in the preferred embodiment may occur to those skilled in this art. Therefore, it is intended that the appended claims shall be construed to include both the preferred embodiment and all such variations and modifications as fall within the true spirit and scope of the invention.

What is claimed is:

1. A method for writing a variable length data stream as a logical record of M storage units on a direct access storage area forming a logging file, said method comprising the steps of:

initializing, before a first writing operation, a key to 1 and saving said key as a head key in the logging file; and, for any other writing operation;

allocating N contiguous storage units for the logging file storage area;

supplying a storage unit key to each storage unit into which data is written;

reading the head key saved in the logging file;

receiving the variable length data stream in a buffer and writing at the top and the bottom of each storage unit a set of at least one key (220, 230);

setting the first storage unit key to the head key incremented by 1 and setting each of the next contiguous storage unit keys to the previous storage unit key incremented by 1;

setting a first offset (offset-w) in the logging file as follows:

if the head key is less than N,
   offset-w=(head key−1) storage units,
   if not,
   offset-w=(remainder(head key/N)−1) storage units;

writing in the logging file the buffered contiguous storage units, the first storage unit having the first offset as set, if the offset of the last contiguous block to be written from said first offset is greater than N, then, the writing step comprising the two following steps:
   writing contiguous storage units starting from the first offset up to offset=(N−1)*storage units, and,
   writing the next contiguous storage units starting from offset 0;

setting the head key=previous head key+M and saving it in the logging file.

2. A method for reading from a given key a logical record having been written in a logging file according to the writing method of claim 1; said method further comprising the steps of:

reading the head key saved by the last write operation;

checking that the given key is less than or equal to the head key and calculating the offset (offset-r) of the corresponding storage unit by
   if the given key is less than N,
   offset-r=(given key−1) storage units,
   if not,
   offset-r=(remainder(given key/N)−1) storage units;

reading in a buffer the storage unit corresponding to the calculated offset;

checking, using the at least one key of the storage unit just read, for data recording coherence inside the storage unit;

checking, using the at least one key that the storage unit just read is the first storage unit of the logical record;

checking, using the set of at least one key that there is more than one storage unit in the logical record;

if there is more than one storage unit, performing, until the last storage unit is read, the following three steps of:

reading in the buffer the next contiguous storage unit;

checking with the set of keys, if the storage unit just read is the next storage unit of the logical record; then, checking with the set of keys for the data recording coherence inside the storage unit.

3. The method of claim 1 characterized in that the set of keys written in each storage unit comprises:

a top header of the storage unit comprising the key of the storage unit, the key of the first storage unit of the logical record and the key of the last storage unit of the logical record a bottom header comprising the key of the storage unit.

4. The method of claim 2 characterized in that:

the checking step with the set of at least one key for data recording coherence inside the storage unit is performed by determining whether the storage unit key in the top header is equal to the key of the bottom header;

the checking step with the set of at least one key whether the storage unit is the first storage unit is performed by checking whether the storage unit key in the top header is equal to the first storage unit key of the top header;

the checking step with the set of at least one key whether there is more than one storage unit in the logical record is performed by determining whether the difference between the last and the first storage unit key of the top header is greater than zero; and, the checking step with the set of at least one key whether the storage unit just read is the next storage unit is performed by checking that first and last storage unit key of top header of the following and the just read storage units are equal.

5. The method of claim 2 where the top header of the storage units comprises a data length parameter said method being further characterized in that the first key of the logging file is not 1 but is equal to an initial key, and a first logical record is written in the logging file, said record comprising only one storage unit and having in its top header a data length parameter set to zero at the offset (offset-I) having the following value:

if the initial key is less than N, offset-I=(initial key−1) storage units, if not, offset-r=(remainder(initial key/N)−1) storage units.

6. The method of claim 1 comprising the following additional step:

writing in each smallest addressable storage unit between the first and the last smallest addressable storage unit, within each storage unit, a presence key which is the value of the storage unit key stored in the top header of said each storage unit.

7. The method of claim 2 further comprising the steps of checking, in each smallest addressable storage unit of each storage unit located between the first and the last smallest addressable storage unit of said each storage unit of the buffered logical record read, that the presence key equal the top header storage unit key of said each storage unit.

8. The method of any of claims 1, 3 or 6 further comprising an additional step of sending an acknowledgement each time a logical record is written in the logging file.

9. An apparatus for writing in logging file variable length records characterized in that it comprises at least one direct access storage support, means for buffering data and means for performing the steps of the method according to any of claims 1, 3 or 6.

10. An apparatus for writing in logging file variable length records characterized in that it comprises at least one direct access storage support, means for buffering data and means for performing the steps of the method according to any of 2, 4 or 7.

* * * * *